United States Patent
Bottomley et al.

(10) Patent No.: US 8,498,325 B2
(45) Date of Patent: Jul. 30, 2013

(54) DIFFERENTIATED LINEAR EQUALIZATION AT COMMUNICATION BASE STATIONS

(75) Inventors: Gregory E. Bottomley, Cary, NC (US); Yi-Pin Eric Wang, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1183 days.

(21) Appl. No.: 12/016,608

(22) Filed: Jan. 18, 2008

(65) Prior Publication Data

US 2009/0185603 A1 Jul. 23, 2009

(51) Int. Cl.
*H04B 1/00* (2006.01)

(52) U.S. Cl.
USPC ........... 375/150; 375/142; 375/144; 375/143; 375/152

(58) Field of Classification Search
USPC .......................... 375/150, 142, 144, 143, 152
See application file for complete search history.

(56) References Cited

U.S. PATENT DOCUMENTS

| | | | |
|---|---|---|---|
| 2005/0111528 A1* | 5/2005 | Fulghum et al. | 375/148 |
| 2005/0215218 A1* | 9/2005 | Bottomley et al. | 455/226.1 |
| 2006/0182204 A1* | 8/2006 | Cairns et al. | 375/340 |
| 2007/0189363 A1 | 8/2007 | Eriksson et al. | |
| 2007/0189364 A1 | 8/2007 | Wang et al. | |
| 2007/0297494 A1* | 12/2007 | Lindoff | 375/148 |

FOREIGN PATENT DOCUMENTS

| | | |
|---|---|---|
| CN | 1906861 A | 1/2007 |
| JP | 2002-319877 A | 10/2002 |

OTHER PUBLICATIONS

Co-pending U.S. Appl. No. 60/942,921, filed Jun. 8, 2007.
Co-pending U.S. Appl. No. 60/943,975, filed Jun. 14, 2007.

* cited by examiner

*Primary Examiner* — Kabir A Timory
(74) *Attorney, Agent, or Firm* — Coats & Bennett, P.L.L.C.

(57) ABSTRACT

The teachings presented herein improve the processing of individual signals of interest included in a received composite signal by computing combining weights and/or signal quality estimates for each signal of interest, e.g., for linear equalization, based on either shared or non-shared correlation estimates. As a non-limiting advantage, the use of shared correlation estimates reduces computational loading as compared to the processing load that would be needed for computing non-shared correlation estimates for all signals of interest. As a further non-limiting advantage, the conditional use of shared and non-shared correlation estimates provides for the use of non-shared correlation estimates where signal characteristic(s) of one or more of the signals of interest warrant such usage, e.g., for one or more high-rate signals of interest.

28 Claims, 11 Drawing Sheets

DIFFERENTIATED LINEAR EQUALIZATION AT COMMUNICATION BASE STATIONS

BACKGROUND

1. Technical Field

The present invention generally relates to signal processing at communication base stations, and particularly relates to differentiated linear equalization of user signals at such base stations.

2. Background Information

In certain types of wireless communication networks, the received signal at a given network base station comprises a received composite signal that includes signals of interest from a plurality of mobile terminals ("users") being supported by the base station. As one example, many users in a Code Division Multiple Access (CDMA) network may simultaneously transmit on the uplink to a supporting base station. That base station receives all of these signals of interest together as a composite, along with any number of interfering signals, and recovers each individual signal of interest by, for example, correlating the composite signal with the unique uplink scrambling code of each user. Similarly, in the downlink, a mobile terminal receives signals transmitted simultaneously from a plurality of multiple base stations.

Indeed, a common aspect of such processing is the correlation of the received composite signal with each user's (or base station's) scrambling code at different code (delay) offsets, to obtain multipath versions of each user's signal of interest. As is well known, these multipath versions can be combined to obtain signal-to-noise ratio (SNR) improvements. In a basic combining system, such as in the well known "Rake" receiver architecture, each signal of interest is despread by a plurality of Rake "fingers" positioned at delay offsets corresponding to the (primary) multipath propagation delays of the signal. A combining circuit then combines the finger output signals using combining weights determined from the complex channel coefficient estimated for each delay path.

Rake processing in the above manner yields SNR improvements for each signal of interest in AWGN conditions, i.e., in the absence of colored interference bearing on the signals of interest. Where spectrally biased interference is at play, which is a common phenomenon in existing and developing wireless communication networks, more sophisticated combining weights are needed to provide "whitening" of the combined signal. To this end, linear equalization receivers, such as "Generalized Rake" (G-Rake) receivers and chip equalizer (CE) receivers, use combining weights that consider the affects of colored interference. However, the computation of these more sophisticated combining weights is not trivial, and generally involves potentially burdensome computations arising from the generation of correlation estimates for each signal of interest. These correlation estimates provide the basis for the computation of whitening combining weights.

In more detail, the received composite signal at a CDMA base station consists of a number of desired signals from users in the base station's own coverage area (cell/sectors), and a number of interfering signals from users in other cells. The other-cell interference may include high-rate, high-power signals, which may arise, for example, from a lack of user transmission scheduling coordination between cells. The presence of such high-power interfering signals will often result in considerable performance degradation to the signals of interest. Thus to improve system capacity and stability, it is desirable to suppress such high-power other-cell interfering signals.

As noted above, linear equalization receiver structures are effective in suppressing dominating colored interference. When multiple receive antennas are available, multiple dominating interfering signals can be suppressed. As is known, combining weights of G-Rake and CE receivers can be derived based on a Minimum Mean Square Error (MMSE) formulation or a Maximum Likelihood (ML) formulation. Also, signal quality can be estimated.

According to the MMSE formulation, the combining weights are $$w_{MMSE} = R_d^{-1} h,\qquad\text{Eq. (1)}$$

where $R_d$ is a matrix of received signal sample correlations or pilot/data symbol despread value correlations, and h is the net channel response. Signal quality can be estimated as $$SINR = \frac{w_{MMSE}^H h}{1 - w_{MMSE}^H h} = \frac{h^H R_d^{-1} h}{1 - h^H R_d^{-1} h}.$$

The ML formulation has combining weights given as $$w_{ML} = R_u^{-1} h,\qquad\text{Eq. (2)}$$

where $R_u$ is the impairment covariance matrix. Signal quality can be estimated as $$SINR = w_{ML}^H h = h^H R_u^{-1} h.$$

For the G-Rake receiver structure, the matrix elements of $R_d$ and $R_u$ are functions of the differences between G-Rake "finger" delays. Equivalently, for the CE receiver structure, the elements of these matrices are a function of the differences between equalization filter tap delays. The elements may also be a function of the sampling phase. In general, delay differences are associated with receive antennas and sampling phases. Thus, when discussing same delay differences, it implies same sampling phases as well.

More efficient G-Rake receiver processing has been proposed, based on the realization that multiple users of interest may share the same finger delay differences. These teachings propose processing the composite received (uplink) signal at the base station, which includes potentially many signals of interest from a plurality of users being supported by the base station. Particularly, the proposed processing calculates received signal sample correlations for a set of delay differences. For G-Rake, the set of delay differences includes the unique relative delay differences for the signals of interest included in the received composite signal. In this manner, the received signal sample correlations can be shared by users having the same relative finger delay differences. The same sharing methodology applies to CE receiver realizations, where more than one user may share the same equalization filter tap delay differences.

Another proposed approach to obtaining shared correlations for use with more than one user's uplink signal of interest relies on the fact that there commonly are many unused codes for users in the uplink. That is, in the CDMA uplink, each user's uplink transmissions are covered by a different scrambling code, meaning that the underlying spreading code set is distinguished between users, and most individual users do not come close to exhausting the full set of spreading codes available in the set. Thus, for any given user, there are one or more unused uplink codes available for estimating impairment correlations.

Particularly, an impairment covariance matrix can be directly estimated using the unused codes of a given user, and this matrix can then be used to generate an estimated data covariance matrix for sharing among multiple users. One approach forms the estimate as $$\tilde{R}_d = \hat{R}_{u,UOI} + \hat{h}_{UOI}\hat{h}_{UOI}^H, \quad \text{Eq. (3)}$$

where $\hat{h}_{UOI}$ and $\hat{R}_{u,UOI}$ are respectively the estimated net response and the estimated impairment covariance matrix estimated using the unused codes for a first user of interest (UOI). The data covariance matrix $\tilde{R}_d$ is shared among the receivers at the base station for processing the signals of interest for other users.

However, while the use of shared correlations offers processing efficiencies, the approach may not provide acceptable performance for processing uplink signals received from certain users. More broadly, the use of shared correlations may not provide acceptable performance where the signal of interest is a relatively high power signal, e.g., where it is a dominant component in the composite received signal. In such cases, the received signal sample correlations are of the form $$\hat{R}_d = R_u + hh^H, \quad \text{Eq. (4)}$$

where $hh^H$ is a significant portion of $\hat{R}_d$. (The "H" denotes the Hermitian matrix.) With the estimated net response $\hat{h}$, the combining weights used for Rake combining become $$\hat{w}_{MMSE} = \hat{R}_d^{-1}\hat{h}. \quad \text{Eq. (5)}$$

Note that the combining weights in Eq. (5) are determined jointly based on the true net response embodied in $\hat{R}_d$ and the estimated net response $\hat{h}$. This circumstance creates a mismatch problem that becomes significant when $hh^H$ dominates the received signal sample correlation matrix and the net response estimate is noisy.

For example, FIG. 1 is a graph illustrating simulated performance for a hypothetical practical G-Rake receiver versus an idealized receiver, for a given signal of interest that is a high-rate/high-power signal. The performance is shown for different amounts of sample averaging for the practical receiver in comparison with the performance of the idealized receiver, where the idealized receiver maintains ideal MMSE combining weights for a given signal of interest. One sees that no matter how much averaging is used to get received signal sample correlations, the raw Bit Error Rate (BER) deviates significantly from the idealized receiver when shared correlation estimates are used for the signal of interest.

SUMMARY

The teachings presented herein improve the processing of individual signals of interest included in a received composite signal by computing combining weights and/or signal quality estimates for each signal of interest, e.g., for linear equalization, based on either shared or non-shared correlation estimates. As a non-limiting advantage, the use of shared correlation estimates reduces computational loading as compared to the processing load that would be needed for computing non-shared correlation estimates for all signals of interest. As a further non-limiting advantage, the conditional use of shared and non-shared correlation estimates provides for the use of non-shared correlation estimates where signal characteristic(s) of one or more of the signals of interest warrant such usage, e.g., for one or more high-rate signals of interest.

The teachings may be implemented as a method and an apparatus, such as by appropriately configuring a receiver system in a wireless communication network base station. In such embodiments, the received composite signal comprises an aggregation of signals of interest from a plurality of individual transmitters—e.g., a plurality of remote radio transmitters transmitting individual signals to the receiver—along with various interfering signals. As a non-limiting example, then, the receiver system may comprise a Code Division Multiple Access (CDMA) receiver system that is implemented within a CDMA base station or terminal device and configured to process individual signals of interest collectively received together in a composite received signal. The receiver system may be implemented in hardware, in software, or in any combination thereof, and may include, for example, any number of special- or general-purpose microprocessors that are configured to carry out numerical and logical processing according to the method(s) described herein.

In at least one embodiment, a receiver system for use in a wireless communication network base station or terminal comprises one or more processing circuits. The processing circuit(s) are configured to determine combining weights for processing signals of interest included in a received composite signal by grouping the signals of interest into first and second groups. The processing circuits are configured to compute the combining weights for each signal of interest in the first group as a function of non-shared correlation estimates, and to compute the combining weights for each signal of interest in the second group as a function of shared correlation estimates. In at least one such embodiment, the receiver system includes one or more linear equalizers configured to combine multipath components of each signal of interest in the first and second groups according to the combining weights computed for each signal of interest.

In one or more other embodiments, a method of determining combining weights for processing signals of interest included in a received composite signal comprises grouping the signals of interest into first and second groups. The method further includes computing combining weights for each signal of interest in the first group as a function of non-shared correlation estimates, and computing combining weights for each signal of interest in the second group as a function of shared correlation estimates.

At least one embodiment of the method also includes combining multipath components of each signal of interest in the first and second groups in a linear equalization receiver system, according to the combining weights computed for each signal of interest. By way of non-limiting examples, the linear equalization receiver system comprises a Generalized Rake (G-Rake) receiver system or, equivalently, a chip equalizer system. In the G-Rake implementation, the combining weights for each signal of interest weight despread values of the signal of interest generated at different Rake finger delays. Similarly, in the chip equalizer implementation, the combining weights for each signal of interest weight received composite signal samples taken at different delay filter tap outputs.

In another embodiment, a method of processing signals of interest included in a received composite signal comprises logically placing each signal of interest into a first group or a second group. The method further includes, for each signal of interest in the first group, determining signal-specific correlation estimates and computing combining weights for processing the signal of interest from the signal-specific correlation estimates. The method further includes, for each signal of interest in the second group, computing combining weights for processing the signal of interest by extracting selected correlation estimates from a pool of shared correlation estimates.

In at least one such embodiment, determining signal-specific correlation estimates comprises, for each signal of interest in the first group, computing impairment correlation estimates from despread values obtained from one or more unused channelization codes for the signal of interest. Further, at least one embodiment includes maintaining the pool of shared correlation estimates based on determining correlations between data samples of the received composite signal corresponding to processing delay differences of the signals of interest in the second group. With that processing, extracting selected correlation estimates from a pool of shared correlation estimates comprises, for each signal of interest in the second group, extracting those correlation estimates particularly corresponding to the signal of interest. For example, extracting correlation estimates from the shared pool of correlation estimates maintained for the second group of signals that particularly correspond to a given signal of interest in the second group comprises selecting those correlation estimates associated with the processing delay differences associated with the given signal of interest.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
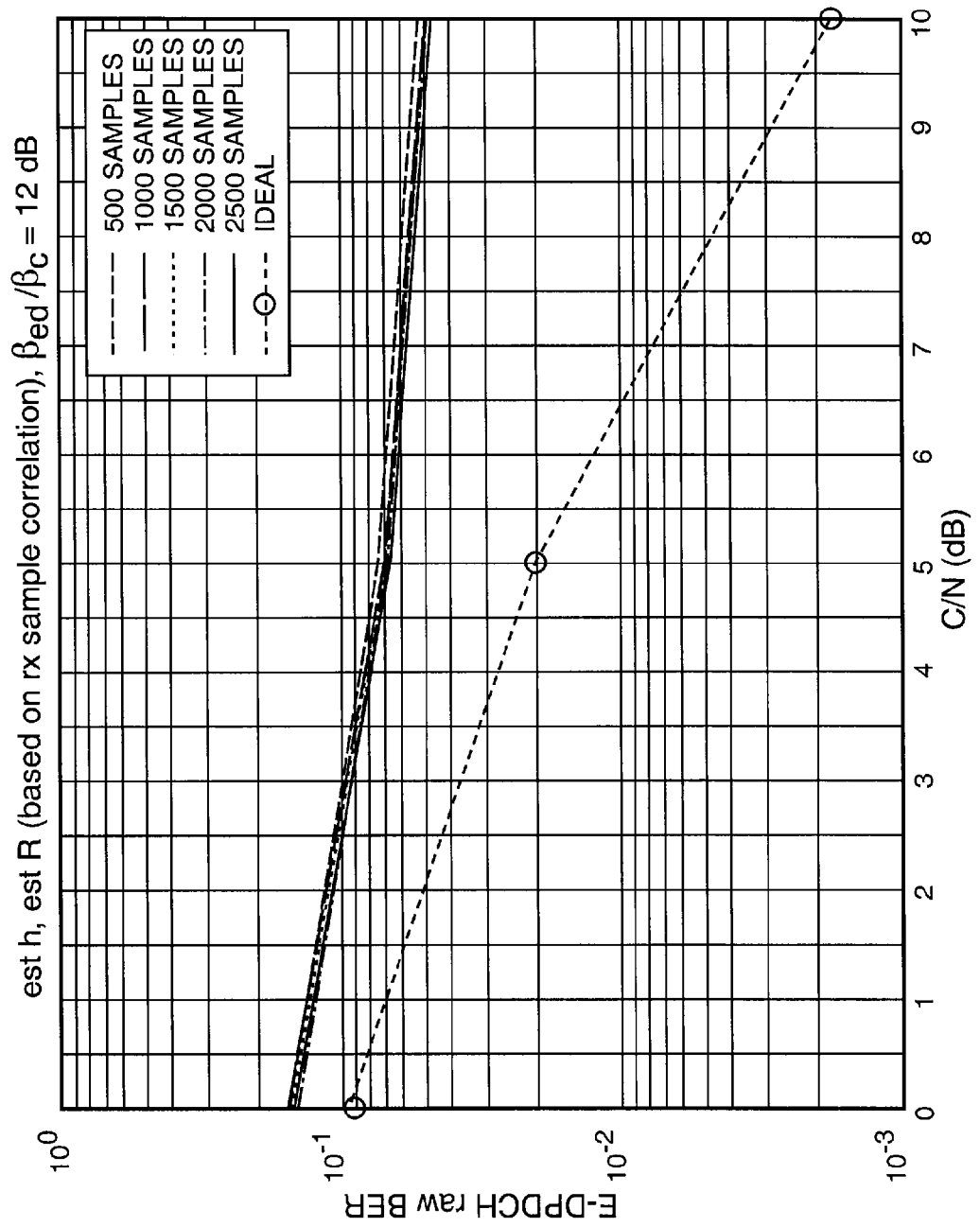
FIG. 1 is a graph illustrating simulated conventional performance for a hypothetical G-Rake receiver versus an idealized receiver, for a given signal of interest that is a high-rate/high-power signal.
Figure 2:
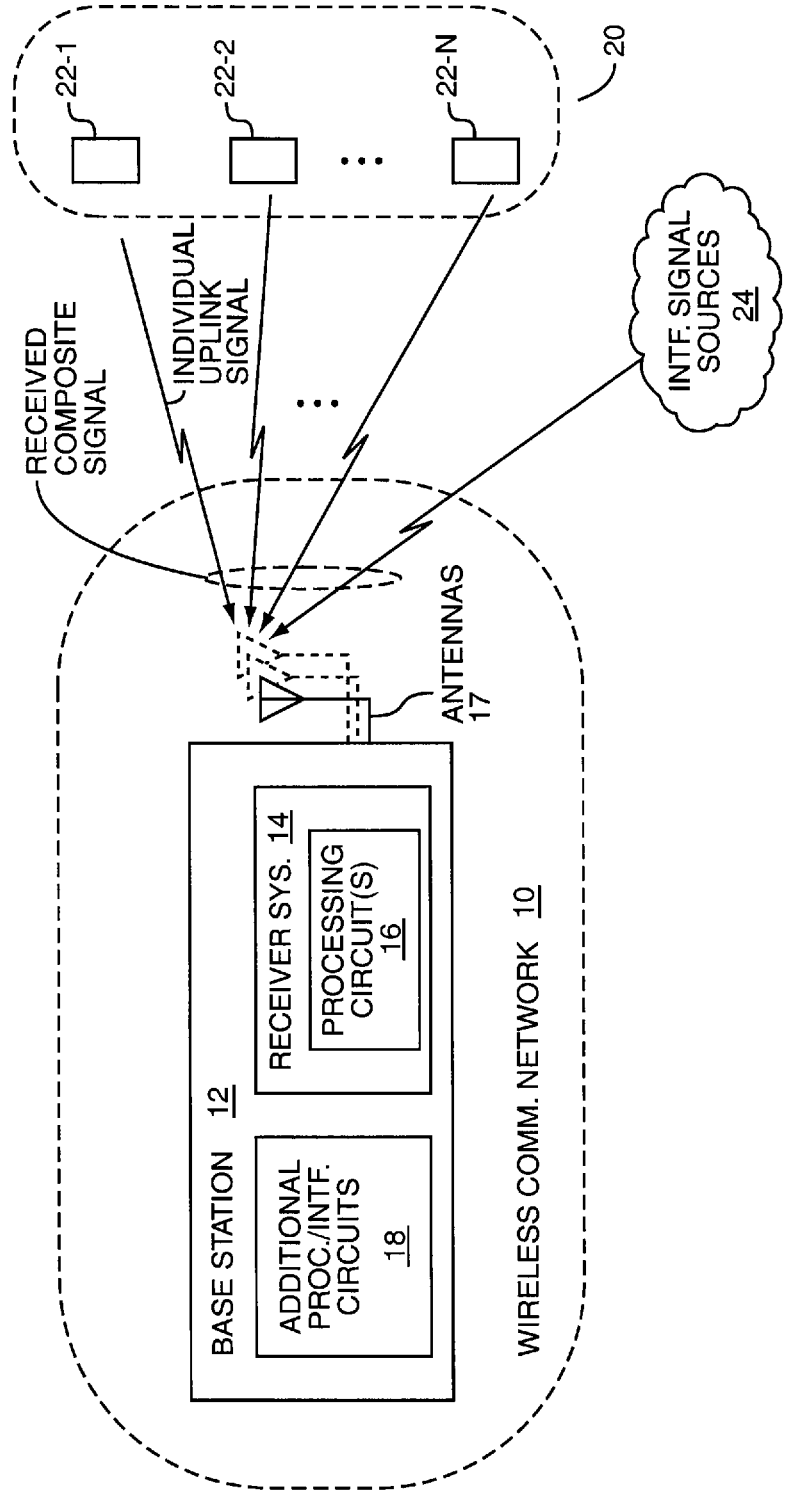
FIG. 2 is a simplified block diagram of a wireless communication network, which may be, according to one or more embodiments taught herein, a CDMA-based network.

FIG. 2 is a simplified block diagram of one embodiment of a wireless communication network 10, which includes a base station 12 comprising a receiver system 14, including one or more processing circuit(s) 16. The base station 12 includes or is associated with one or more base station antenna and/or antenna elements 17, and further comprises additional processing/interface circuits 18 as appropriate for interfacing the base station 12 to one or more other network entities, performing communication call processing, etc. The wireless communication network 10 comprises, as a non-limiting example, a Code Division Multiple Access (CDMA) network, e.g., a Wideband CDMA network, and the base station 12 correspondingly comprises a CDMA base station.

Germane to this discussion, the base station 12 provides service coverage, e.g., radio signal coverage, over one or more service regions, such as cells or sectors (not explicitly shown). The base station 12 receives a composite received signal on the uplink, which includes individual uplink signals from a plurality 20 of users being supported by the base station 12. The users are represented by individual mobile stations 22-1, 22-2, . . . , 22-N, each of which transmits an individual uplink signal that represents a signal of interest within the received composite signal at the base station 12. The received composite signal at the base station 12 also includes interference from various interference sources 24, such as the uplink signals from users in other cells of the network 10, etc.

The receiver system 14 is configured to recover and process the individual signals of interest from the received composite signal, such as for channel compensation and interference suppression in support of signal demodulation and decoding for the recovery of transmitted data from each signal of interest. The generation of combining weights (for each signal of interest) is one aspect of such processing, wherein the combining weights are used, for example, in linear equalization in G-Rake or CE implementations of the receiver system 14. Signal quality estimation is another aspect of such processing.

Advantageously, the receiver system 14 is configured to obtain computational efficiencies by using shared correlation estimates for combining weight and signal quality computations at least where the usage of shared correlation estimates is not expected to result in unacceptable signal processing performance. For example, in one or more embodiments, the one or more processing circuits 16 of the receiver system 14 are configured to determine combining weights for processing signals of interest included in a received composite signal by grouping the signals of interest into first and second groups. The one or more processing circuits 16 compute combining weights for each signal of interest in the first group as a function of non-shared correlation estimates, and compute combining weights for each signal of interest in the second group as a function of shared correlation estimates. Signal quality can be estimated from the combining weights or directly from the correlation estimates.

Broadly, the one or more processing circuits 16 comprise hardware, software, or any combination thereof. In at least one embodiment, they comprise at least one special- or general-purpose microprocessor circuit, where that term encompasses DSP-type processors. In such embodiments, the above-described operative configuration of the one or more processing circuits 16 may be obtained by, for example, provisioning a memory/storage device of the base station 12 with a computer program comprising program instructions corresponding to the described processing. Of course, it will be appreciated that it may be advantageous to implement at least a portion of the signal processing using dedicated hardware-based processing elements.

Figure 3:
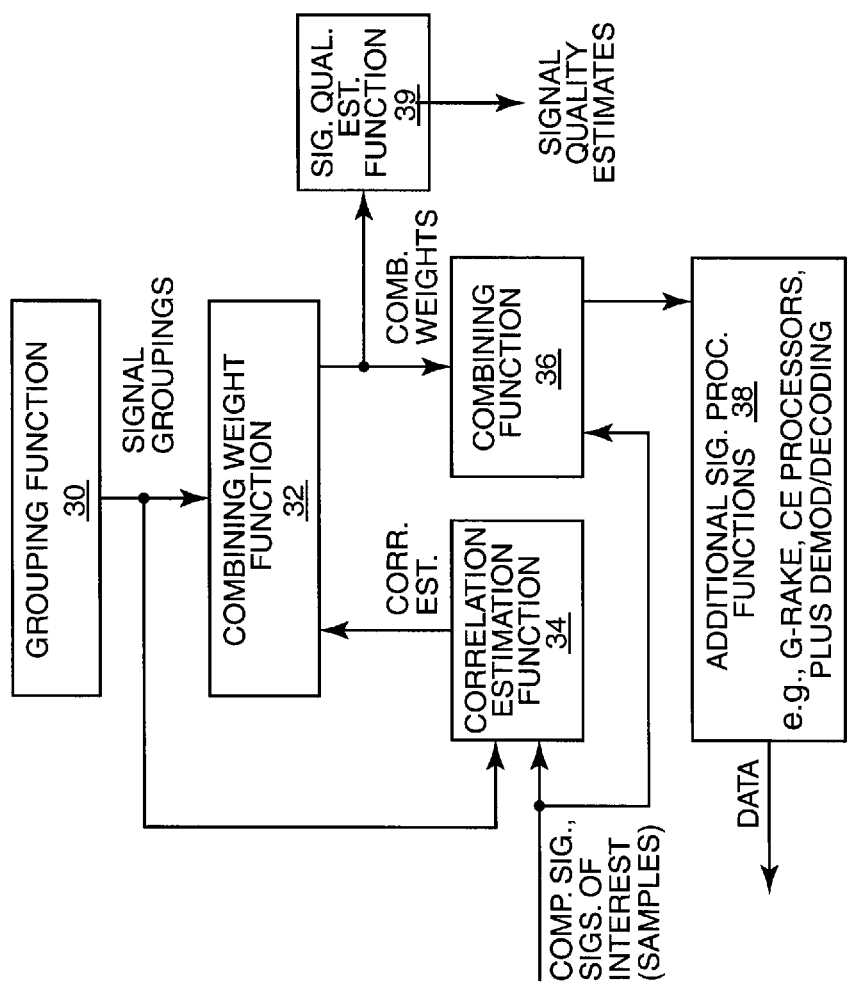
FIG. 3 is a block diagram of functional processing elements according to one embodiment of a receiver system for use in a base station, where the receiver system is configured selectively to use shared and non-shared correlation estimates for processing a plurality of signals of interest received at the base station.

In any case, FIG. 3 illustrates one embodiment of functional circuits implemented by the one or more processing circuits 16. The illustrated functional circuits include a grouping function 30 operative to group the signals of interest into the first and second groups, a combining weight function 32 operative to compute the combining weights for the signals of interest, a correlation estimation function 34 operative to determine shared and non-shared correlation estimates as needed, a combining function 36 operative to combine the processing path components of each signal of interest with the corresponding combining weights, a signal quality estimation function 39 operative to determine signal quality estimates, and additional signal processing functions 38, which include, e.g., G-Rake or CE processing circuits, decoding circuits, etc., to operate on the combined versions of the signals of interest. (Note that the combining function 36 may be an operative part of the G-Rake or CE processing circuits.)

Figure 4:
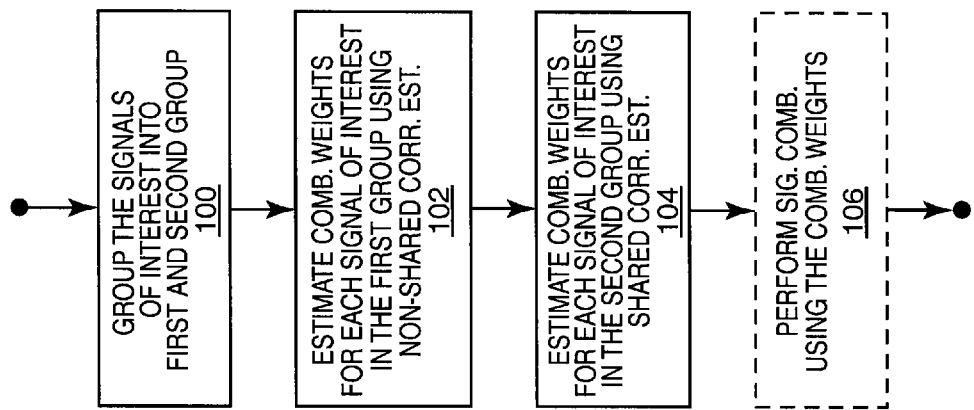
FIG. 4 is a logic flow diagram of one embodiment of processing logic for implementing a method of using shared and non-shared correlation estimates for processing signals of interest.

FIG. 4 illustrates an embodiment of a method which can be implemented by the above-described functional circuit arrangement, and by variations of that arrangement. The illustrated processing should not be construed as defining a limiting sequential order of processing steps, unless noted, nor should the illustrated processing be construed as necessarily representing stand-alone processing performed over a discrete interval of time. Indeed, at least some aspects of the illustrated processing may be performed as part of a larger set of supporting base station functions, and parts of the illustrated processing may be performed more frequently than others.

Figure 5:
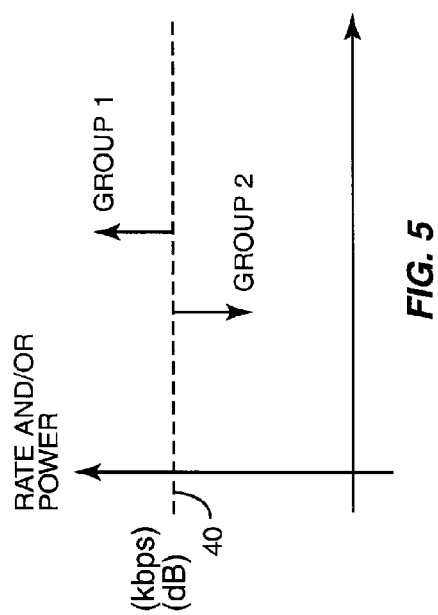
FIG. 5 is a graph of a data rate and/or received signal power threshold, which is used for one or more embodiments of evaluating individual signals of interest to determine whether they are processed using shared or non-shared correlation estimates.

Processing "begins" with grouping the signals of interest included in the base station's received composite signal into first and second groups (Block 100). In one embodiment, the receiver system 14 is configured to group the signals of interest into the first and second groups by placing each signal of interest into either the first group or into the second group based on evaluating a data rate related criterion of each signal of interest. For example, FIG. 5 illustrates that the receiver system 14 may store information defining a data rate or received signal power threshold 40, which may be fixed or dynamically varied (such as by overall base station loading, processing resource availability, etc.). For example, signals of interest whose assigned or actual transmission data rates are above the threshold 40 are placed into the first group (Group 1), and the other signals of interest are placed into the second group (Group 2).

Similarly, the receiver system 14 is configured in one or more other embodiments to group the signals of interest into the first and second groups by placing each signal of interest into either the first group or into the second group based on evaluating received signal powers of the signals of interest. Thus, the threshold 40 may be defined in terms of received signal power. With that definition, the signals of interest having received signal powers (as measured by the receiver system 14 or other entity in the base station 12) above the threshold 40 are placed into Group 1, with the other signals of interest being placed into Group 2.

It should be noted that higher-rate ones of the signals of interest generally are transmitted at higher powers than lower-rate ones, all other things being equal. Therefore, the term "data rate criterion" should be given broad construction, and can indicate an explicit data rate criterion, or inferential criterion, such as measured received signal powers, measured received signal qualities, identifications of the service types each signal of interest is supporting, etc.

Figure 6:
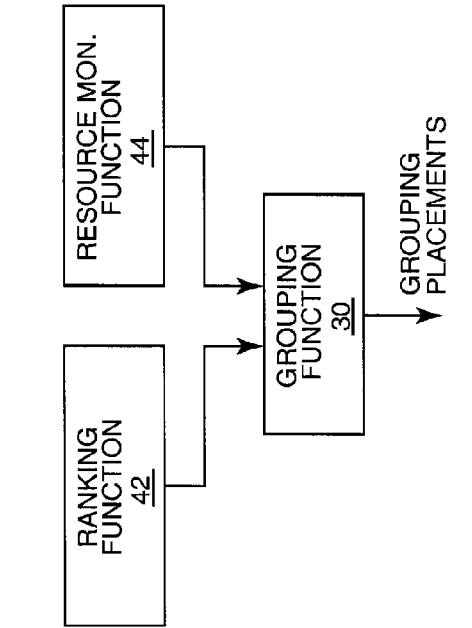
FIG. 6 is a block diagram of one embodiment of functional processing elements, which provide for the consideration of resource availability for determining whether shared or non-shared correlation estimates are used for processing one or more signals of interest.

Of course, computing non-shared correlation estimates for the Group 1 signals of interest potentially consumes more processing resources than would the use of shared correlation estimates. FIG. 6 thus illustrates an embodiment where the receiver system 14 includes a ranking function 42, which ranks the signals of interest in the received composite signal by a data related criterion (rate, power, signal quality, such as SNR, or other parameter). With that ranking, the grouping function 30 logically places signals of interest into Group 1 in rank order (highest ranked first).

The number of ranked signals of interest placed into Group 1 for non-shared correlation estimation can be governed, for example, through use of a resource monitoring function 44. That function can be configured to track the current allocations of processing resources (whether measured in logical or physical hardware, e.g., Rake finger availability, or measured in computational load, etc.), or equivalently to track the current reserve of allocable resources. In either approach, the resource monitoring function 44 can be configured to indicate to the grouping function 30 when processing resource availability permits the assignment of signals of interest to Group 1. Thus, one or a very few resource-hungry signals of interest may reside in Group 1 at a given time, but later a larger set of less resource-hungry signals of interest may be placed in Group 1.

The evaluation and grouping may be performed rapidly, such as at every transmission interval in a Wideband CDMA (WCDMA) system. Alternatively, it may be performed at multiples of a basic transmission interval, or on an as-needed basis. For example, grouping placement occurs as new signals of interest become active. Also, it should be noted that some service types, e.g., Voice-over-IP (VoIP), are relatively low-rate applications by definition, at least in comparison to higher-quality multimedia broadcasting/streaming services. As such, where the service type(s) supported by each signal of interest are considered, one or more signals of interest may be initially placed into Group 1 or Group 2 as a function of their service types, and the grouping placement need not be revisited unless their service types change, or unusual signal conditions develop (e.g., unexpectedly high power).

Carrying that thought back to FIG. 4, then, it will be appreciated that all of FIG. 4 may be repeated in a looped processing structure at a common rate, but that at least Block 100 may be performed more slowly and/or on an as-needed basis. Regardless, the processing of FIG. 4 includes estimating combining weights for each signal of interest in the first group (Group 1) using non-shared correlation estimates (Block 102). Generally, the processing of this block is repeated as quickly as is needed to support the desired combining weight update rate. In turn, that rate must be fast enough to provide desired whitening (colored interference suppression) and channel compensation performance. As such, Block 102 may be repeated at, for example, the basic transmission interval rate associated with the base station's uplink processing of the signals of interest.

In one or more embodiments, the receiver system 14 is configured to compute the combining weights for each signal of interest in the first group by deriving signal-specific correlation estimates from each signal of interest in the first group, and to compute the combining weights for each signal of interest in the first group from the corresponding signal-specific correlation estimates. For example, in at least one embodiment, the receiver system 14 is configured to derive the signal-specific correlation estimates from each signal of interest in the first group by obtaining despread values from each signal of interest in the first group, and estimating impairment correlations from the despread values. In one such embodiment, the receiver system 14 is configured to obtain the despread values from each signal of interest in the first group by obtaining despread values corresponding to one or more unused channelization codes of the signal of interest.

It will be remembered that for CDMA embodiments at least, the individual signals of interest can be recovered from the received composite signal by correlating the received composite signal with a user-specific code, e.g., a scrambling or other long code that is unique to each mobile station 22-$x$ (where "$x$" denotes any one of the mobile stations 22). Further, each signal of interest is channelized using, e.g., a set of Walsh codes or other orthogonal/quasi-orthogonal spreading codes. To the extent that the mobile station 22-$x$ does not transmit on all of the defined codes, the receiver system 14 of the base station 12 can despread the signal of interest from the mobile station 22-$x$ on one or more of that mobile station's unused codes and use those despread values to obtain signal-specific impairment correlation estimates. "Impairment" in this context generally includes interference plus noise.

In another embodiment, the receiver system 14 implements a so-called "parametric" G-Rake receiver architecture and parametrically estimates signal-specific correlations for each signal of interest in the first group. (In a parametric G-Rake, impairment correlations are represented in a model, and the model is fitted to rough impairment correlation measurements taken from the signal of interest via a least-squares or other fitting process.) In yet another embodiment, the receiver system 14 calculates signal-specific correlation estimates for each signal of interest in the first group using despread pilot values or despread data values of traffic data symbols. Thus, while the calculation of signal-specific correlations for each signal in the first group may preferably be based on computing individualized impairment correlation estimates for each such signal from despread values obtained on the unused codes of each such signal, those skilled in the art will appreciate that the teachings presented herein are not limited to that approach.

The processing of FIG. 4 further includes estimating combining weights for each signal of interest in the second group (Group 2) (Block 104), and, depending on the particular signal processing desired, processing may continue with performing signal combining based on the computed combining weights (Block 106). For example, the combining weights computed for each signal of interest may be used for combining multipath components of each signal of interest in the first and second groups in a linear equalization receiver system.

In the above descriptions for correlation estimation regarding the first group of signals of interest, the receiver system 14 derived non-shared correlation estimates for each signal of interest from that signal of interest, e.g., using the scrambling code of the signal of interest. In contrast, in one or more embodiments, the receiver system 14 is configured to derive the shared correlation estimates from the received composite signal. In at least one embodiment, the receiver system 14 is configured to compute the combining weights for each signal of interest in the second group as a function of shared correlation estimates, based on deriving a set of correlation estimates from the received composite signal corresponding to processing delay differences associated with the signals of interest in the second group. With that approach, for each signal in the second group, the receiver system 14 is configured to extract from the set of correlation estimates those correlation estimates particularly corresponding to the signal of interest.

Here, "particularly corresponding" does not imply that the correlation estimates extracted from the pool of shared correlation estimates are absolutely unique to the given signal of interest in the second group. Instead, that phrase is used because the pool of shared correlation estimates generated for the signals of interest in the second group includes values for the at least one of processing delay differences, receive antenna differences, and, possibly, received signal sampling phases, that are collectively associated with the signals of interest in the second group. Thus, selecting correlation estimates from the shared pool that particularly correspond to a given signal of interest in the second group comprises, for example, selecting those correlation estimate values corresponding to that given signal's particular processing delay differences, receive antenna differences, and, possibly, its sampling phases.

Figure 7:
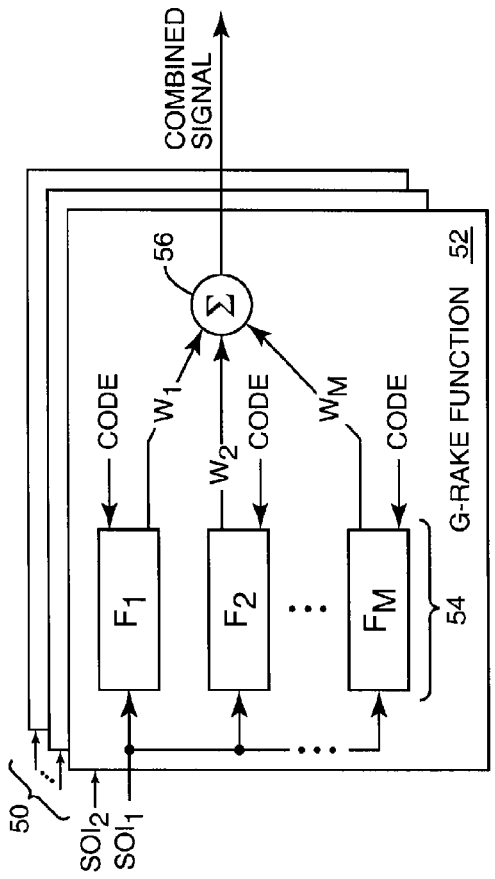
FIGS. 7 and 8 are block diagrams of functional processing elements corresponding to embodiments of Generalized Rake (G-Rake) and chip equalizer (CE) receiver architectures.

Continuing with illustrated details, FIG. 7 illustrates a set 50 of G-Rake functions 52, each of which can be used to process a given signal of interest included in the received composite signal. Each G-Rake function 52 includes a plurality of Rake fingers 54 (correlators) that allow one or more selected code channels to be despread from a signal of interest. Each Rake finger outputs a finger signal (despread values obtained from the signal of interest), and each finger signal is weighted by one of the combining weights ($w_1, w_2, \ldots, w_m$) from the corresponding vector of combining weights w determined for the signal of interest. A combining function 56 combines the weighted finger signals to produce a combined signal for further processing (e.g., decoding to recover transmitted data).

For each signal of interest in the first group, the combining weights are computed using non-shared, signal-specific correlation estimates. However, for each signal of interest in the second group, the combining weights are computed using shared correlation estimates. For the G-Rake example, the shared correlation estimates can be computed by determining the correlations between samples of the received composite signal at delay differences (for certain sampling phases) corresponding to the delay and/or antenna differences between the Rake fingers 54. Thus, to the extent that the delay differences for a first signal of interest are partly or wholly the same as the delay differences for one or more other signals of interest, the correlation estimates computed for those delay differences may be shared among the corresponding G-Rake functions 52.

As such, the processing circuit(s) 16 can be configured to generate a pool of shared correlation estimates covering all of the delay differences between the Rake finger delays of each G-Rake function 52 being used to process a signal of interest in the second group. To the extent that a given delay difference is applicable to more than one signal of interest, the correlation estimate determined for that delay difference can be shared among the G-Rake functions 52 of those signals of interest. Broadly, the pool of shared correlation estimates includes correlation estimates for all of the unique delay differences represented by the aggregate set of Rake functions 52 being used for processing the signals of interest in the second group.

Figure 8:
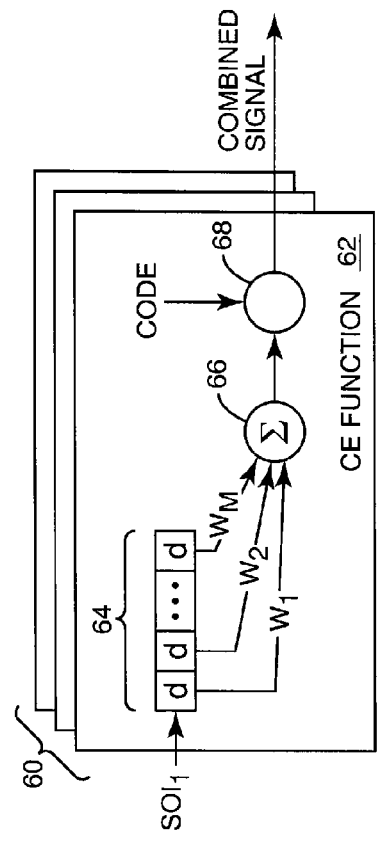

FIG. 8 illustrates a comparable arrangement for processing the signals of interest included in the received composite signal, but one based on a CE receiver architecture rather than the above G-Rake receiver architecture. The receiver system 14 in this embodiment includes a set 60 of CE functions 62, each of which can be used to process a given signal of interest. Each CE function 62 includes a serial delay register 64, a combining circuit 66, and a correlator 68. The delay register 64 provides an output tap at each delay stage, such that samples of the signal of interest may be taken at selected processing delays and weighted according to the combining weights ($w_1, w_2, \ldots, w_m$) from the corresponding vector of combining weights w determined for the signal of interest. Again, those combining weights are computed from shared correlation estimates for signals of interest in the second group, and from non-shared correlation estimates for signals of interest in the first group.

As with the G-Rake implementations finger delay differences, one sees that the shared correlation estimates may be computed for the filter tap delay differences of each CE function 62. That is, the digital filtering determined for each signal of interest dictates the selection of tap outputs from a subset of delay stages in the delay register 64, and two or more of the signals of interest in the second group may shared at least some of the same tap delay differences, meaning that they can share correlation estimates corresponding to those shared tap delay differences.

With FIGS. 6 and 7 in mind, it should be understood that the teachings herein provide a method wherein the processing delays (used as the basis for shared correlation estimation) can comprise Rake receiver finger delays for multipath processing of the signals of interest in the second group, or equivalently can comprise chip equalization filter tap delays for multipath processing of the signals of interest in the second group. Further, it should be understood that the receiver system's one or more processing circuits 16 include, in one or more embodiments, hardware and/or software resources that can be dynamically assigned or otherwise allocated for processing the signals of interest included in the received composite signal. With that arrangement, pools of G-Rake or CE processing elements may be available from which particular processing resources are assigned to each signal of interest.

Thus, the receiver system 14 can be configured to, for example, compute combining weights for each signal of interest in the second group as a function of shared correlation estimates based on deriving a set of correlation estimates from the received composite signal corresponding to processing delay differences associated with the signals of interest in the second group, and, for each signal in the second group, extracting from the set of correlation estimates those correlation estimates particularly corresponding to the processing delay differences of the signal of interest. That is, in at least one embodiment, a control function or other processing element within the one or more processing circuits 16 selects the appropriate subset of correlation estimates from a pool of shared correlation estimates, for each signal of interest in the second group. Here, the pool of shared correlation estimates comprises the aggregate collection of all unique delay differences needed for processing the signals of interest in the second group.

In at least one such embodiment, the receiver system 14 is configured to maintain the shared correlation estimates as a set of data sample correlations obtained from the received composite signal at delay differences corresponding to a set of processing delay and/or antenna differences for the signals of interest in the second group. In this context, maintaining the shared correlation estimates as the set of data sample correlations obtained from the received composite signal at delay differences corresponding to the set of processing delay and/or antenna differences for the signals of interest in the second group includes updating the set of data sample correlations to reflect changing multipath characteristics of the signals of interest in the second group and to reflect signals of interest being added to and dropped from the second group.

Figure 9:
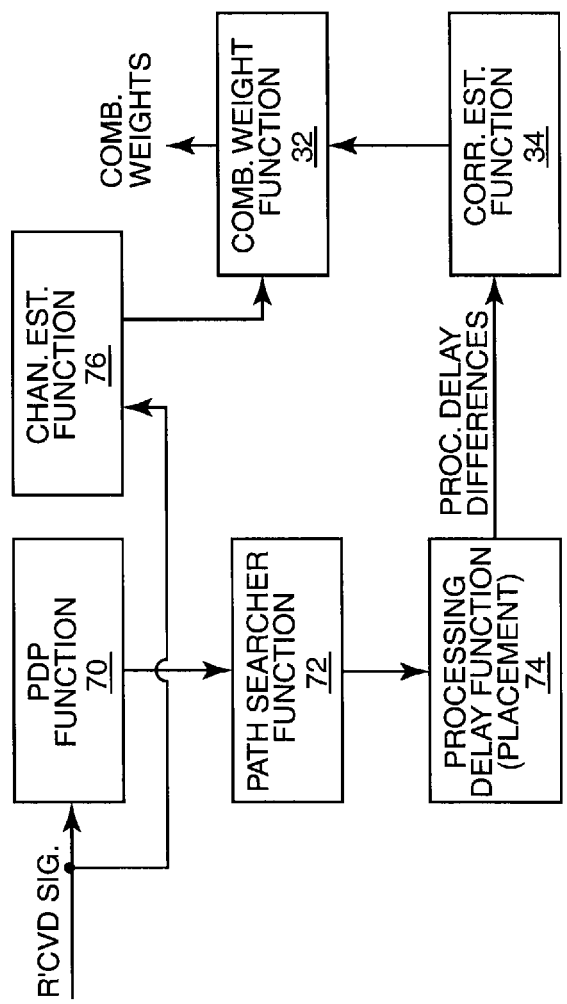
FIG. 9 is a block diagram of one embodiment of functional processing elements for determining path delays and channel estimates in support of correlation estimation.

FIG. 9 illustrates processing functions (i.e., hardware and/or software based circuits) implemented within the one or more processing circuits 16 in one or more embodiments of the receiver system 14, which are directed to generating and maintaining the pool of shared correlation estimates. The illustrated functions may process all of the signals of interest, or they may be functionally duplicated as needed, for like processing of multiple signals of interest in parallel. As applied to any given signal of interest, the illustrated functions include a path searcher function 70, a Power Delay Profile (PDP) function 72, a processing delay function 74 (e.g., a finger/tap placement processor), and a channel estimation function 76. These functions are shown in context with the combining weight function 32 and correlation estimation function 34 introduced in FIG. 3.

For each signal of interest, the PDP function 70 uses the received signal to generate a power/delay profile (PDP) for the signal of interest. The path searcher function 72 identifies multipath components, e.g., by detecting correlation peaks in the PDP on a defined timing grid. In turn, the processing delay function 74 determines which processing delays are appropriate for multipath processing of the signal of interest—e.g., which CE filter taps or which G-Rake finger delay placements to use. The correlation estimation function 34 computes correlation estimates using, e.g., received composite signal samples taken at the identified processing delays, such that it produces inter-sample correlation estimates for the differences between those delays.

Notably, the correlation estimation function 34 may include or be associated with a control element that recognizes whether any of the delay differences identified for a particular signal of interest are shared with other signals of interest in the second group, such that correlation estimation processing can be skipped for those delay differences, in favor of reusing (sharing) correlation estimates already calculated for those delay differences. Any new correlation estimates calculated for the signal of interest may be placed into the pool of shared correlation estimates, so that they also can be shared. In any case, the combining weight function 32 uses the appropriate correlation estimates and corresponding channel estimates (which generally are unique to each signal of interest) to compute the combining weights for processing the signal of interest.

Figure 10:
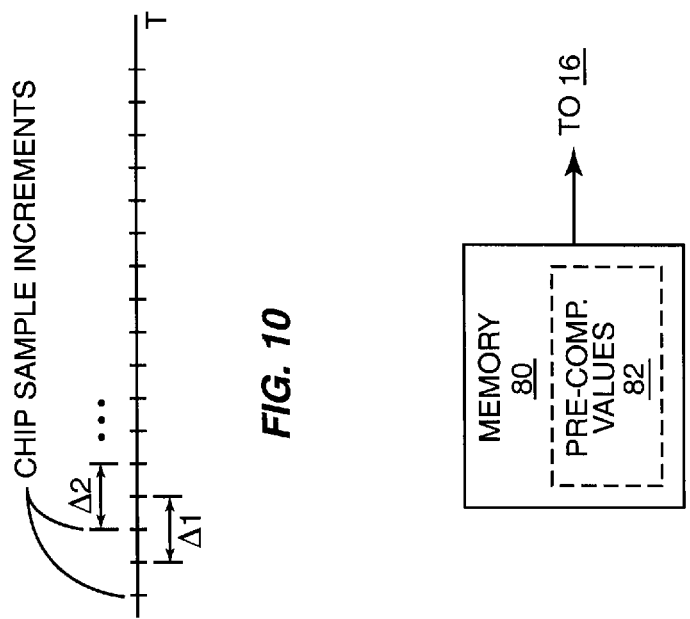
FIG. 10 is a graph of one embodiment of a delay processing grid comprising a predefined set of processing delay offsets, which are used for placing G-Rake fingers and/or CE filter taps in one or more embodiments.

While the above approach includes dynamic calculation of shared correlation estimates to cover the unique delay differences represented in the aggregate by the signals of interest in the second group, the teachings herein also contemplate additional embodiments that offer further processing load reductions. Particularly, FIG. 10 illustrates a processing delay grid, which represents, for example, a predefined set of allowed Rake finger placements or CE filter taps.

Figure 11:
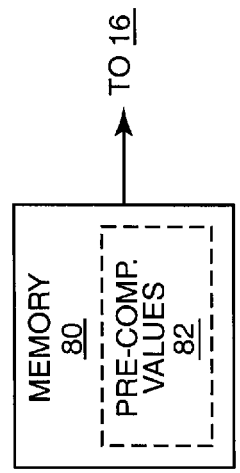
FIG. 11 is block diagram of one embodiment of a memory circuit or other storage device, implemented in a base station for storing pre-computed correlation estimates corresponding to the delay differences defined by a predefined processing grid.

With this predefined and constrained set of allowed processing delays, the receiver system 14 can be configured with pre-computed correlation estimates corresponding to the universe of possible delay differences. FIG. 11 illustrates that the receiver system 14 includes or is associated with a memory 80 or other storage device, which stores a data structure 82 (table, list, etc.) containing pre-computed correlation estimates representing all of the possible delay differences applicable to the defined placement grid of FIG. 10.

Of course, regardless of whether the shared correlation estimations represent on-the-fly or pre-computed values, the teachings of this disclosure reflect the insight that shared correlation estimates may not yield desired signal processing performance for certain ones of the signals of interest. For very high-rate signals of interest ("users"), it may be necessary to use non-shared, signal-specific correlation estimates, to achieve the desired signal processing performance. In particular, it may be preferred to compute non-shared correlation estimates for each such signal of interest using unused (channel) codes to derive the combining weights for that signal of interest.

Figure 12:
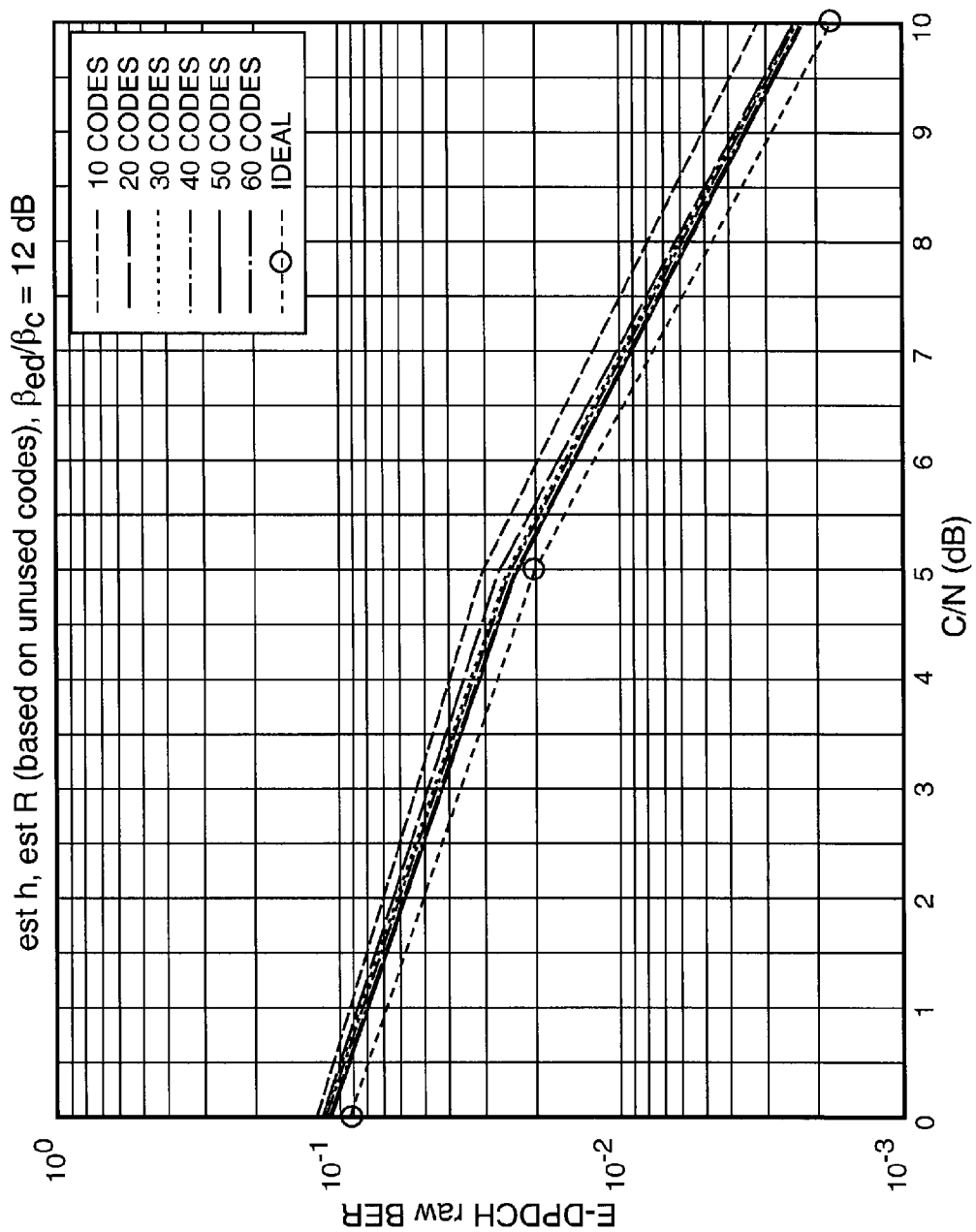
FIG. 12 is a graph comparing the Bit Error Rate (BER) performance of one embodiment of a G-Rake receiver configured according to teachings presented herein, in comparison with an idealized G-Rake receiver.

For example, FIG. 12 illustrates BER performance for base station decoding of a defined WCDMA uplink data channel from a given mobile station 22-$x$, comparing the performance of a practical G-Rake receiver estimating impairment correlations for the signal using unused codes with the performance of an ideal G-Rake receiver that has perfect impairment correlation knowledge. One sees that impairment correlations determined from relatively few unused codes are sufficient to approximate the performance of the ideal receiver.

Figure 13:
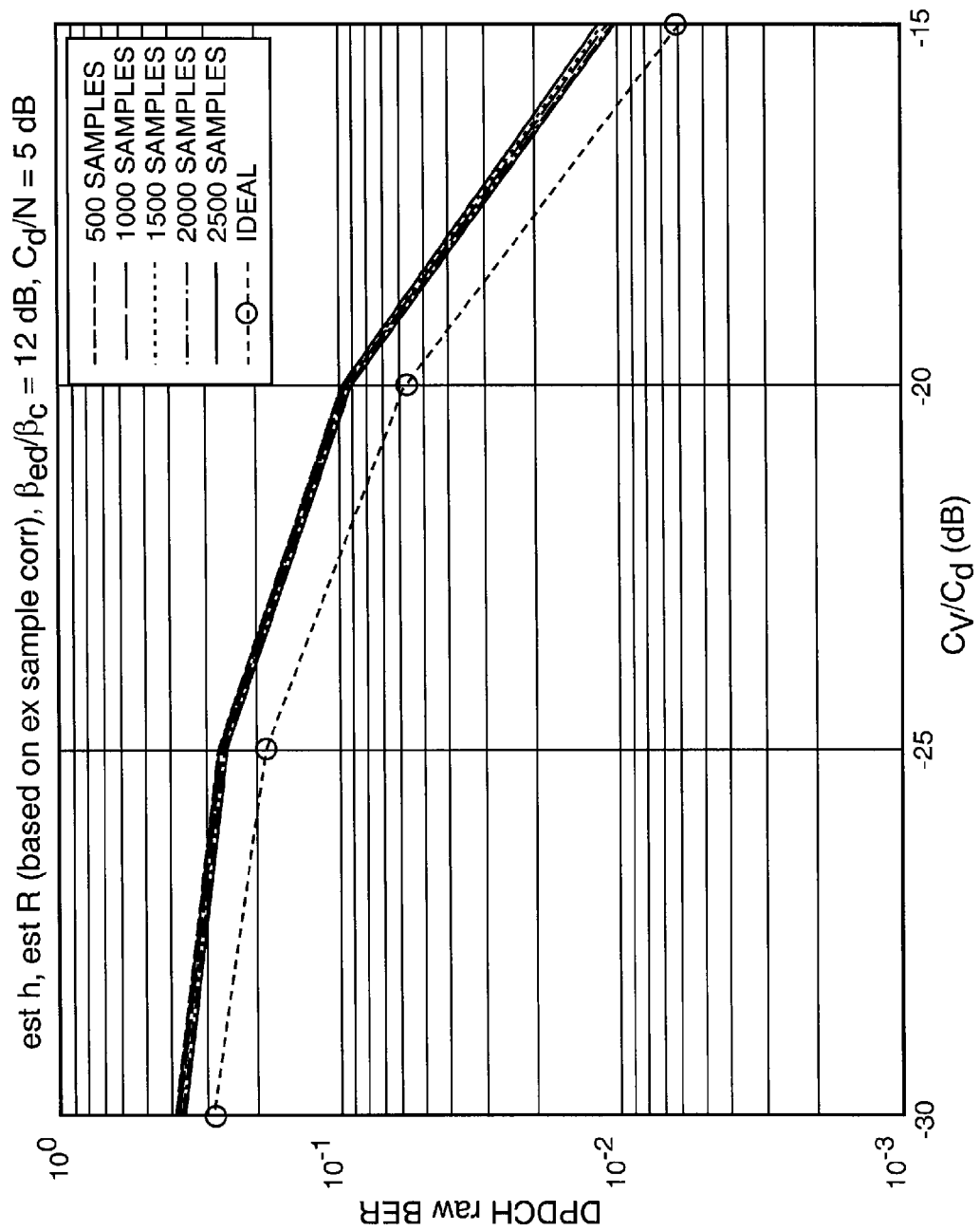
FIG. 13 is a graph comparing the BER performance of a practical G-Rake receiver configured according to an embodiment presented herein for processing for lower-rate signals of interest using shared correlation estimates, as compared to the performance of an ideal G-Rake receiver.
Figure 14:
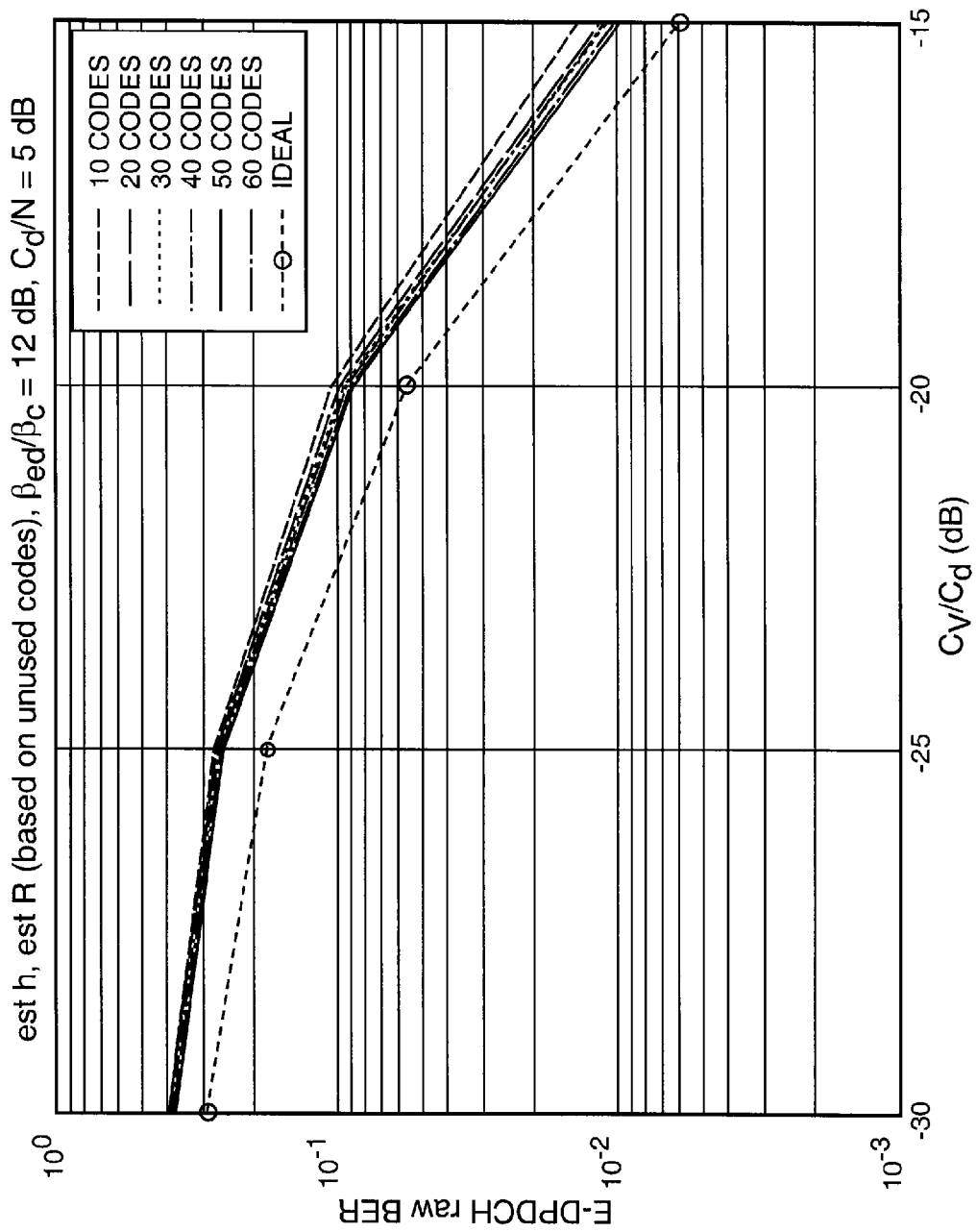
FIG. 14 is a graph comparing the BER performance of a practical G-Rake receiver configured according to an embodiment presented herein for processing for lower-rate signals of interest using non-shared correlation estimates, as compared to the performance of an ideal G-Rake receiver.

Further, FIGS. 13 and 14 illustrate that good signal processing performance can be achieved for low-rate signals of interest, regardless of whether the G-Rake determines combining weights from unused code correlations (non-shared, signal-specific) or from received composite signal sample correlations (shared, non-specific). Thus, for voice and/or other low-rate applications, the receiver system 14 can reduce/simplify its processing by using shared correlations as taught herein.

Figure 15:
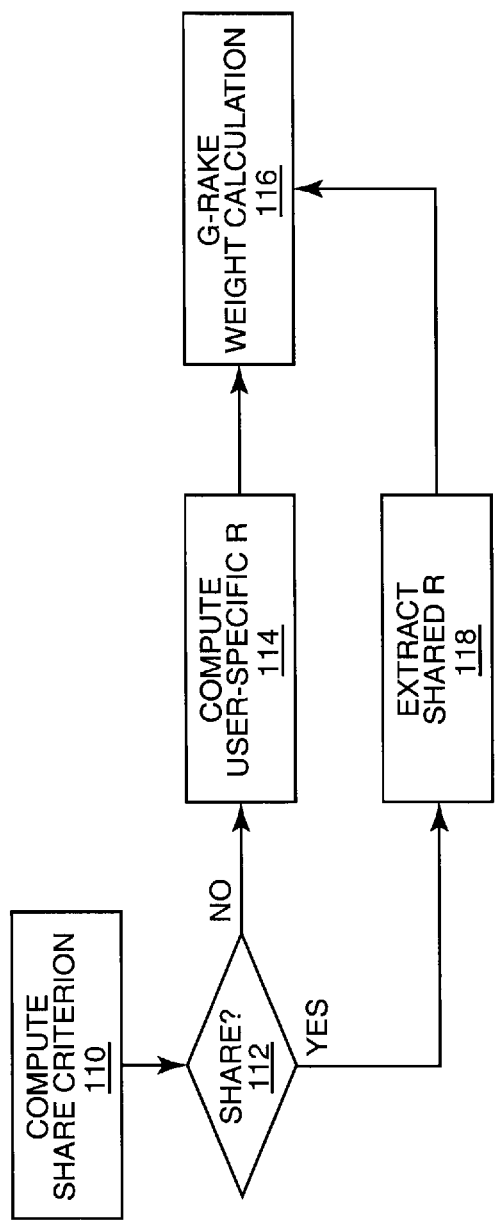
FIG. 15 is a logic flow diagram for one embodiment of processing logic for implementing a method of processing received signals of interest using either shared or non-shared correlation estimates.

FIG. 15 accordingly sets forth one G-Rake based embodiment of a method of processing a plurality of signals of interest included in a received composite signal. Those skilled in the art will appreciate that the processing qualifications/variations, looping control, etc., as described for FIG. 4 apply here.

With that in mind, the illustrated processing begins assuming that a given signal of interest included in the received composite signal is being evaluated. As such, a sharing criterion is computed for the signal of interest (Block 110). As noted earlier, the sharing criterion may be defined as a data rate related criterion. For example, the sharing criterion may be defined as a data rate or received signal power threshold, such as was shown in FIG. 5. The sharing criterion also may consider current processing resource availability at the base station 12, such as shown in FIG. 6. It will be understood that the same sharing criterion can be evaluated for each signal of interest, or the sharing criterion can be computed differently for at least some of the signals of interest. For example, as signals of interest are logically added to the first group for non-shared correlation estimation, the sharing criterion may be adjusted to raise the threshold for adding another signal of interest to the first group.

Processing continues for the signal of interest with evaluating the sharing criterion (Block 112). If the sharing criterion indicates that the use of shared correlation estimates is not appropriate for the signal of interest, processing continues with the computation of non-shared correlation estimates, e.g., with the computation of a user-specific impairment covariance matrix $R_u$ (Block 114) and the determination of G-Rake combining weights based on the user-specific correlation estimates (Block 116).

Conversely, if the sharing criterion indicates that the use of shared correlation estimates is appropriate for the signal of interest, processing continues from Block 112 with the computation of shared correlation estimates for the signal of interest (Block 118). That computation comprises, for example, extracting the appropriate subset of shared correlation estimates from a pool of shared correlation estimates. That is, Block 118 may comprise forming $R_d$ for the signal of interest based on the G-Rake finger delay differences corresponding to the signal of interest.

Thus, according to the teachings presented herein, one or more embodiments of the base station 12 uses a sharing criterion to determine whether user-specific correlations or shared correlations are used for determining the G-Rake combining weights for given users of interest. By way of non-limiting examples, the sharing criterion can be a transmission rate, received power, or received signal-to-interference-plus noise ratio (SINR), for the signal of interest. The user-specific correlations can be, for example, impairment correlations estimated by using the unused codes from the perspective of the user of interest, or other user-specific correlations such as parametric impairment or data covariance matrices. The shared correlations can be, for example, received signal sample correlations. For example, the despread values of unused codes can be used to derive the combining weights for the G-Rake receiver of a high-rate user, while, for medium-to-low rate users, the combining weights are derived using shared receive signal sample correlations.

Figure 16:
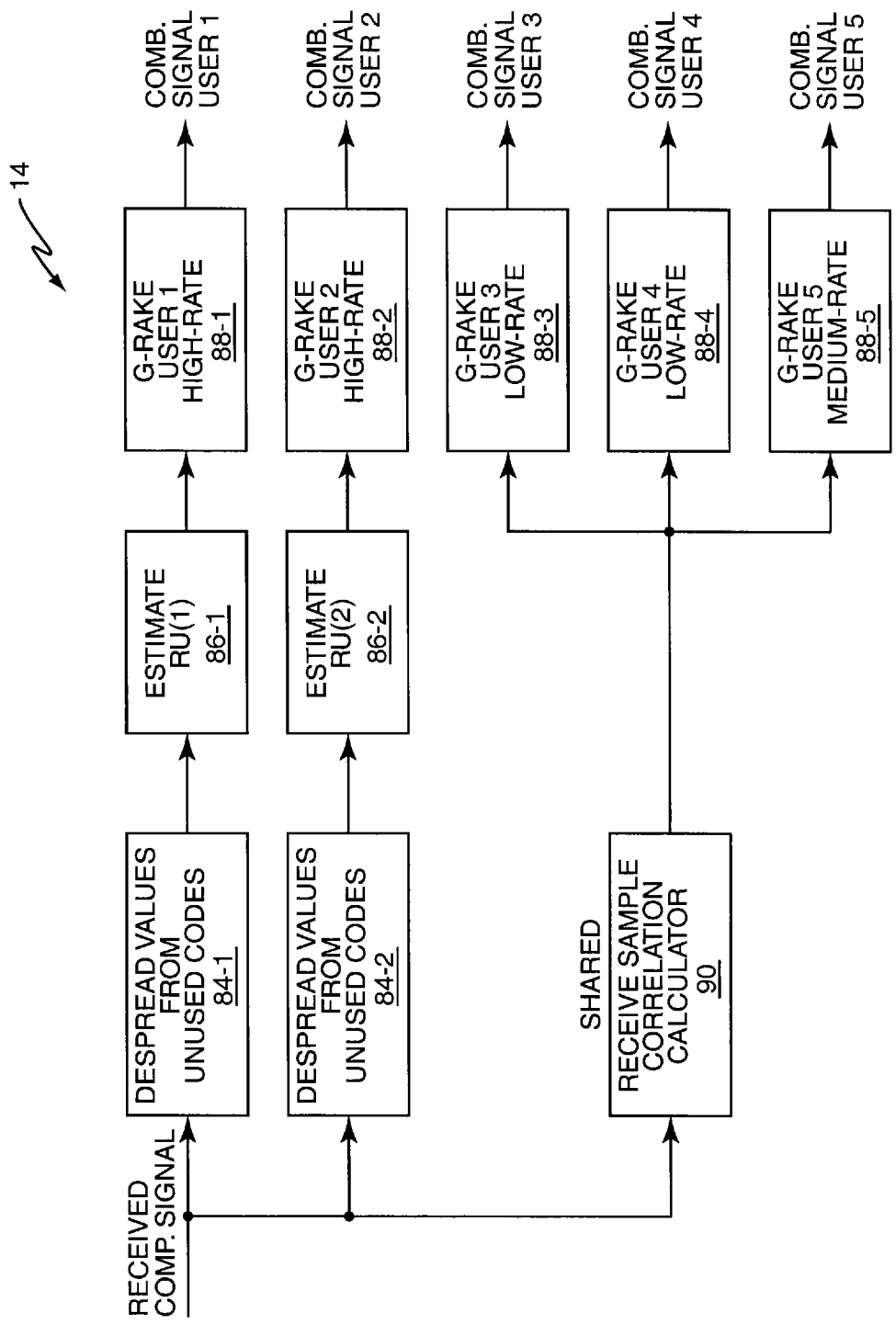
FIG. 16 is a block diagram of functional processing elements for a G-Rake embodiment of a base station receiver system.

FIG. 16 illustrates another embodiment of a base station receiver architecture that can be embodied in the receiver system 14 according to the above example using hardware and/or software provisioning of the receiver system 14. One sees despreading functions 84-1 and 84-2 used to obtain despread values from unused codes for two users (User 1 and User 2), for which non-shared correlation estimates are to be used. Correspondingly, two impairment correlation estimation functions 86-1 and 86-2 use the user-specific despread values to determine user-specific correlation estimates in the form of impairment covariance matrices $R_{u,\,user1}$ and $R_{u,\,user2}$. In turn, G-Rake processing functions 88-1 and 88-2 perform G-Rake combining of User 1's signal of interest and User 2's signal of interest, respectively, using combining weights $w_{user1}$ and $w_{user2}$, as determined from $R_{u,\,user1}$ and $R_{u,\,user2}$.

For three other users, User 3, User 4, and User 5, the use of shared correlation estimates is appropriate. Thus, a correlation estimation function 90 determines (as needed) shared correlation estimates for the processing delay differences applicable to the G-Rake processing of signals of interest for Users 3, 4, and 5. For example, it determines inter-sample correlations between data samples taken from the received composite signal for the processing delays of interest with respect to Users 1-3. In turn, the receiver system 14 computes combining weights $w_{user3}$, $w_{user4}$, and $w_{user5}$ for combining the G-Rake finger signals for each of User 3, User 4, and User 5, in the respectively assigned G-Rake processing functions 88-3, 88-4, and 88-5.

In further detail, for G-Rake processing of the signal of interest from a User i, whose signal of interest is to be combined using combining weights determined from non-shared correlation estimates, let $y_k^i(m)$ be the despread value from the ith user's kth unused code during mth symbol interval (e.g., a defined symbol interval in a received WCDMA-based uplink signal of interest). Note that the spreading factor for an unused code can be chosen arbitrarily. Note also that $y_k^i(m)$ may contain despread values from multiple receive antennas—see, e.,g., the one or more base station receive antennas 17 shown in FIG. 2. The estimated impairment covariance matrix can be obtained by $$\hat{R}_u(i) = \frac{1}{KM} \sum_{k=1}^{K} \sum_{m=1}^{M} y_k^i(m)(y_k^i(m))^H \qquad \text{Eq. (6)}$$

where K is the number of unused codes and M is the number of symbol periods used. The estimated impairment covariance matrix $\hat{R}_u(i)$ is then used to formulate the G-Rake combining weights for User i.

The receive sample correlation for a delay difference $\Delta$ with respect to a (base station) antenna pair i and j, and sampling phase m can be calculated by $$\hat{r}_d^{i,j}(m, \Delta) = \frac{1}{L} \sum_{l=1}^{L} r_i(lT_c + mT_s) r_j^*(lT_c + mT_s + \Delta) \qquad \text{Eq. (7)}$$

where $T_c$ is the chip period, $T_s$ is the sampling period, L is the smoothing factor, and $r_n(t)$ is the received composite signal at time t from the nth base station receive antenna. The delay differences will include all the delay differences between G-Rake fingers of every G-Rake processing function 88-i being used to process the signals of interest in the second group (Group 2), which comprise all the medium-to-low rate signals of interest in one or more embodiments. Each G-Rake processing function 88-i for each user i in the second group can thus obtain its own data covariance matrix $\hat{R}_d(i)$ by taking or otherwise selecting the appropriate values from the pool of shared received composite signal sample correlations.

As discussed in preceding examples, a given user is classified as a high-rate signal or medium-to-low rate signal based on one or more criteria, such as the rate, the received power, the SINR, etc. The rate can be the actual transmission rate of the user or the rate granted by the base station 12.

Figure 17:
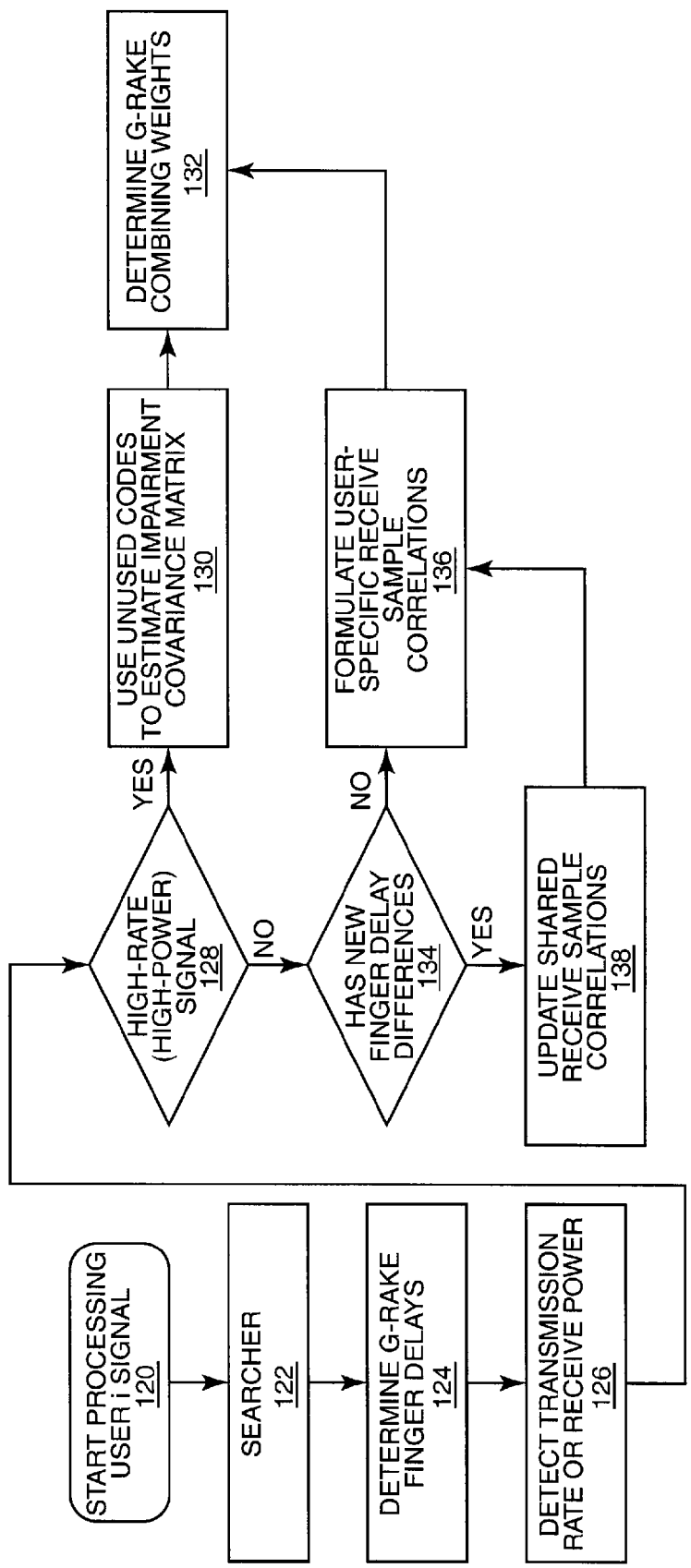
FIG. 17 is a logic flow diagram for one G-Rake embodiment of processing logic for implementing combining weight based signal processing, based on the selective use of shared and non-shared correlation estimates for computing those combining weights.

An exemplary flow chart for determining G-Rake combining weights at a CDMA-implementation of the base station 12 is shown in FIG. 17. The previously mentioned qualifications regarding possible variations in processing order, looping, etc., apply equally to FIG. 17.

With that in mind, processing begins (Block 120) with finding the path delays of a signal of interest using a path searcher function (Block 122), e.g., path searcher function 70 from FIG. 9. The path delays are used to determine the G-Rake finger delays for the processing of this particular signal of interest (Block 124). Then, the sharing criterion is estimated. In the illustration, the sharing criterion is the signal's transmission rate (granted or actual) or the signal's received power at the base station 12 (Block 126).

The sharing criterion is then evaluated (Block 128), with that evaluation serving as the basis for classifying whether the signal of interest is a high-rate user—which may be evaluated from any one or more of signal rate, signal power, and signal SNR. If the signal of interest is classified as being that of a high-rate user, unused codes for that user are used to estimate an impairment covariance matrix for the user (Block 130). In turn, that user-specific impairment covariance matrix is used to determine G-Rake combining weights for the user (Block 132).

On the other hand, if the user's signal of interest is not considered a high-rate signal by whatever sharing criterion is used, the receiver system 14 checks whether the G-Rake finger delay differences applicable to the signal of interest are all represented in the pool of shared correlation estimates (Block 134). More particularly, this embodiment evaluates whether the delay differences applicable to the signal of interest represent any new delay differences for which shared correlation estimates are not already available. If not, processing continues with the formulation of correlation estimates for the signal of interest based on extracting or otherwise selecting the appropriate data sample correlations from the pool (Block 136). While these data sample correlations are specific to the signal of interest in the sense that they are selected to match the G-Rake finger delay differences applicable to the signal of interest, they are considered to be "shared" within the context of this discussion because they are commonly available for use with any other signal of interest having one or more of like delay differences.

That is, the correlation estimates to be used for computing combining weights for the signal of interest are obtained by reading (extracting) the shared sample correlations according to the user-specific delay differences applicable to the signal of interest and possibly sampling phases. In any case, the extracted data sample correlations are used to compute combining weights for the signal of interest for G-Rake processing (Block 132).

On the other hand, with respect to Block 134, if one or more of the delay differences applicable to the signal of interest are not represented in the pool of shared correlation estimates, processing includes updating that pool with received signal sample correlations for those new delays (Block 138). In this manner, the pool may be maintained by adding new data sample correlations as new delay differences come into play (and by deleting any data sample correlations that become obsolete as users are dropped, added, and as conditions change). Of course, as mentioned earlier herein, the pool of shared correlation estimates may comprise pre-computed values representing the universe of delay differences corresponding to a defined processing delay grid (see FIGS. 9 and 10, for example).

With these and other variations described herein, those skilled in the art will appreciate that the teachings herein are not limited to the foregoing description, nor are such teachings limited to the embodiments represented in the drawings. Broadly, the teachings herein logically place signals of interest included in a received composite signal into a first or second group. That placement is driven by evaluating a sharing criterion for the signals, which indicates the appropriateness or desirability of computing signal combining from non-shared correlation estimates, or from shared correlation estimates. The use of shared correlation estimates reduces processing complexity, but may not yield desired processing performance for high-rate signals of interest, for example.

In this regard, then, the teachings herein allow a base station receiver system, such as may be implemented in hardware and/or software within a CDMA base station, to provide for the computation of non-shared correlation estimates for use with one or more selected signals of interest, while simultaneously exploiting the signal processing complexity reductions gained through the use of shared correlation estimates for other signals of interest. As such, the present invention is not limited by the foregoing description and accompanying drawings. Instead, the present invention is limited only by the following claims and their legal equivalents.

What is claimed is:

1. A method of determining combining weights for processing signals of interest included in a received composite signal comprising:
    grouping the signals of interest into first and second groups;
    computing combining weights for each signal of interest in the first group as a function of non-shared correlation estimates; and
    computing combining weights for each signal of interest in the second group as a function of shared correlation estimates.

2. The method of claim 1, further comprising combining multipath components of each signal of interest in the first and second groups in a linear equalization receiver system, according to the combining weights computed for each signal of interest.

3. The method of claim 1, wherein said grouping of the signals of interest into the first and second groups comprises placing each signal of interest into either the first group or into the second group based on evaluating a sharing criterion for each signal of interest.

4. The method of claim 3, wherein said placing each signal of interest into either the first group or into the second group based on evaluating a sharing criterion for each signal of interest comprises placing each signal of interest into either the first group or into the second group based on evaluating a data rate related criterion of each signal of interest.

5. The method of claim 1, further comprising estimating signal quality of at least one signal of interest in the first or second groups according to the combining weights computed for that at least one signal.

6. The method of claim 1, further comprising wherein said computing combining weights for each signal of interest in the first group as a function of the non-shared correlation estimates includes deriving signal-specific correlation estimates from each signal of interest in the first group, and computing the combining weights for each signal of interest in the first group from the corresponding signal-specific correlation estimates.

7. The method of claim 6, wherein said deriving signal-specific correlation estimates from each signal of interest in the first group comprises obtaining despread values from each signal of interest in the first group, and estimating impairment correlations from the despread values.

8. The method of claim 6, wherein said deriving signal-specific correlation estimates from each signal of interest in the first group comprises obtaining despread values from each signal of interest in the first group, corresponding to one or more unused channelization codes of the signal of interest, and estimating impairment correlations from the despread values.

9. The method of claim 1, wherein said computing combining weights for each signal of interest in the second group as a function of shared correlation estimates includes deriving a set of correlation estimates from the received composite signal corresponding to at least one of processing delay differences, antenna delay differences, and sampling phases, that are associated collectively with the signals of interest in the second group, and, for each signal in the second group, extracting from the set of correlation estimates those correlation estimates particularly corresponding to the signal of interest.

10. The method of claim 1, further comprising maintaining the shared correlation estimates as a set of data sample correlations obtained from the received composite signal at delay differences corresponding to a set of processing delay differences for the signals of interest in the second group.

11. The method of claim 10, wherein said maintaining the shared correlation estimates as the set of data sample correlations obtained from the received composite signal at delay differences corresponding to the set of processing delay differences for the signals of interest in the second group includes updating the set of data sample correlations to reflect changing multipath characteristics of the signals of interest in the second group and to reflect signals of interest being added to and dropped from the second group.

12. The method of claim 10, wherein the processing delays comprise Rake receiver finger delays for multipath processing of the signals of interest in the second group, or equivalently comprise chip equalization filter tap delays for multipath processing of the signals of interest in the second group.

13. The method of claim 1, wherein the received composite signal comprises a composite of a plurality of received Code Division Multiple Access (CDMA) uplink signals from a plurality of remote radio transmitters.

14. The method of claim 1:
    wherein the signals of interest included in the received composite signal are received from a plurality of transmitters;
    wherein the non-shared correlation estimates are non-shared in that they are not-shared among the plurality of transmitters; and
    wherein the shared correlation estimates are shared in that they are shared among the plurality of transmitters.

15. A method of processing signals of interest included in a received composite signal comprising:
    logically placing each signal of interest into a first group or a second group;
    for each signal of interest in the first group, determining signal-specific correlation estimates and computing at least one of combining weights and a signal quality estimate for processing the signal of interest from the signal-specific correlation estimates; and
    for each signal of interest in the second group, computing at least one of combining weights and a signal quality estimate for processing the signal of interest by extracting selected correlation estimates from a pool of shared correlation estimates.

16. The method of claim 15, wherein said determining signal-specific correlation estimates comprises, for each signal of interest in the first group, computing impairment correlation estimates from despread values obtained from one or more unused channelization codes for the signal of interest.

17. The method of claim 15, further comprising maintaining the pool of shared correlation estimates based on determining correlations between data samples of the received composite signal corresponding to at least one of processing delay differences, receive antenna differences, and signal sampling phases, that are associated collectively with the signals of interest in the second group, and wherein said extracting selected correlation estimates from a pool of shared correlation estimates comprises, for each signal of interest in the second group, extracting those correlation estimates particularly corresponding to the signal of interest.

18. The method of claim 15:
wherein the signals of interest in the received composite signal are received from a plurality of transmitters; and
wherein the shared correlation estimates are shared in that they are shared among the plurality of transmitters.

19. A receiver system for use in a wireless communication network base station, said receiver system comprising one or more processing circuits configured to determine combining weights for processing signals of interest included in a received composite signal by:
grouping the signals of interest into first and second groups;
computing combining weights for each signal of interest in the first group as a function of non-shared correlation estimates; and
computing combining weights for each signal of interest in the second group as a function of shared correlation estimates.

20. The receiver system of claim 19, wherein the receiver system includes one or more linear equalizers configured to combine multipath components of each signal of interest in the first and second groups according to the combining weights computed for each signal of interest.

21. The receiver system of claim 19, wherein the receiver system is configured to group the signals of interest into the first and second groups by placing each signal of interest into either the first group or into the second group based on evaluating a sharing criterion of each signal of interest.

22. The receiver system of claim 21, wherein the sharing criterion comprises a data rate related criterion and wherein the receiver system is configured to group the signals of interest into the first and second groups by placing each signal of interest into either the first group or into the second group based on evaluating the data rate related criterion of each signal of interest.

23. The receiver system of claim 19, wherein the receiver system is configured to estimate signal quality of at least one signal of interest in the first or second groups according to the combining weights computed for that at least one signal.

24. The receiver system of claim 19, wherein the receiver system is configured to compute the combining weights for each signal of interest in the first group by deriving signal-specific correlation estimates from each signal of interest in the first group, and to compute the combining weights for each signal of interest in the first group from the corresponding signal-specific correlation estimates.

25. The receiver system of claim 24, wherein the receiver system is configured to derive the signal-specific correlation estimates from each signal of interest in the first group by obtaining despread values from each signal of interest in the first group, and estimating impairment correlations from the despread values.

26. The receiver system of claim 25, wherein the receiver system is configured to obtain the despread values from each signal of interest in the first group by obtaining despread values corresponding to one or more unused channelization codes of the signal of interest.

27. The receiver system of claim 19, wherein the receiver system is configured to compute the combining weights for each signal of interest in the second group as a function of shared correlation estimates by deriving a set of correlation estimates from the received composite signal corresponding to at least one of processing delay differences, receive antenna differences, and signal sampling phases, that are associated collectively with the signals of interest in the second group, and, for each signal in the second group, extracting from the set of correlation estimates those correlation estimates particularly corresponding to signal of interest.

28. The receiver system of claim 19:
wherein the signals of interest included in the received composite signal are received from a plurality of transmitters;
wherein the non-shared correlation estimates are non-shared in that they are not-shared among the plurality of transmitters; and
wherein the shared correlation estimates are shared in that they are shared among the plurality of transmitters.

* * * * *

UNITED STATES PATENT AND TRADEMARK OFFICE
CERTIFICATE OF CORRECTION

PATENT NO.        : 8,498,325 B2                           Page 1 of 1
APPLICATION NO.   : 12/016608
DATED             : July 30, 2013
INVENTOR(S)       : Bottomley et al.

It is certified that error appears in the above-identified patent and that said Letters Patent is hereby corrected as shown below:

In the Specification:

In Column 8, Line 59, delete "(VoIP)," and insert -- (VoIP), --, therefor.

In Column 12, Line 34, delete "path searcher function 70," and insert -- path searcher function 72, --, therefor.

In Column 12, Line 35, delete "(PDP) function 72," and insert -- (PDP) function 70, --, therefor.

In Column 15, Line 61, delete "path searcher function 70" and insert -- path searcher function 72 --, therefor.

Signed and Sealed this
First Day of April, 2014

Michelle K. Lee
*Deputy Director of the United States Patent and Trademark Office*